(12) United States Patent
Arakawa et al.

(10) Patent No.: US 7,725,765 B2
(45) Date of Patent: May 25, 2010

(54) METHOD AND APPARATUS FOR ENCRYPTION WITH RAID IN STORAGE SYSTEM

(75) Inventors: Hiroshi Arakawa, Sunnyvale, CA (US); Nobuyuki Osaki, Saratoga, CA (US)

(73) Assignee: Hitachi, Ltd., Tokyo (JP)

( * ) Notice: Subject to any disclaimer, the term of this patent is extended or adjusted under 35 U.S.C. 154(b) by 908 days.

(21) Appl. No.: 11/537,557

(22) Filed: Sep. 29, 2006

(65) Prior Publication Data

US 2008/0092029 A1 Apr. 17, 2008

(51) Int. Cl.
G06F 11/10 (2006.01)
(52) U.S. Cl. .......................................... 714/6; 714/770
(58) Field of Classification Search ...................... 714/6, 714/770
See application file for complete search history.

(56) References Cited

U.S. PATENT DOCUMENTS

| | | | | |
|---|---|---|---|---|
| 6,643,822 B1 * | 11/2003 | Murthy | ........................ | 714/805 |
| 7,337,331 B2 * | 2/2008 | Yoshida | ........................ | 713/193 |
| 7,401,194 B2 * | 7/2008 | Jewell | ........................ | 711/162 |
| 7,562,230 B2 * | 7/2009 | Komarla et al. | ............. | 713/193 |

OTHER PUBLICATIONS

Patterson, David A., et al., "A Case for Redundant Arrays of Inexpensive Disks (RAID)," 1988, pp. 109-116, Association for Computing Machinery, Berkeley, U.S.A.
"Fujitsu ETERNUS8000 Storage Systems," Fujitsu, Ltd.
"Fujitsu ETERNUS4000 Storage Systems," Fujitsu, Ltd.

* cited by examiner

Primary Examiner—Stephen M Baker
(74) Attorney, Agent, or Firm—Sughrue Mion, PLLC

(57) ABSTRACT

The described methodology provides users with the ability to specify flexible encryption options in a storage system using RAID technology. The users can use the system to achieve a configuration which achieves a desired balance between security and system load/performance. Specifically, one aspect of the methodology enables the user to enable or disable the encryption of the redundant parity information. Change of the data causes change of the parity information and, when parity is not encrypted, a close analysis of parity change may enable one to reconstruct the all or some of the encrypted data. Therefore, when a user chooses the encryption of the parity information, it becomes more difficult to reconstruct the plain data from the encrypted data. The described storage system also provides a function for monitoring and reporting the current or projected utilization of various computer resources including processor and memory utilization, which assists the user in selecting the proper security option.

26 Claims, 15 Drawing Sheets

| LUN | Address Range |
|---|---|
| 0 | PG0:0-1023, PG2:2048-3071 |
| 1 | PG0:1024-2047, PG3:0-1023 |
| : | |

| Parity Group | RAID Type | Disk Number |
|---|---|---|
| 0 | RAID5 | 0, 1, 2, 3 |
| 1 | RAID6 | 10, 11, 12, 13, 14, 15, 16, 17 |
| : | | |

| LUN | Key Value |
|---|---|
| 0 | Key0 |
| 1 | Key1 |
| : | |

| LUN | Encryption processing for parity | Method | Mode |
|---|---|---|---|
| 0 | Yes | AES | CBC |
| 1 | No | DES | EBC |
| : | | | |

| Segment Number | 1000 |
|---|---|
| LUN | 1 |
| Address Range in LUN | 0-511 |
| Disk Number | 3 |
| Address Range in Disk | 1024-1535 |
| Cache Status | Dirty |
| Type | New Parity |
| Encryption Status | Encrypted |
| Encryption Request | Yes |

METHOD AND APPARATUS FOR ENCRYPTION WITH RAID IN STORAGE SYSTEM

FIELD OF THE INVENTION

The present invention relates to storage systems and more specifically to storage systems having data encryption capability.

DESCRIPTION OF THE RELATED ART

Storage systems using RAID technology were introduced by D. A. Patterson, G. Gibson and R. H. Kats in "A Case for Redundant Arrays of Inexpensive Disks (RAID)", published in Proc. ACM SIGMOD, pp. 109-116, June 1988 and incorporate herein by reference in its entirety. RAID storage system configurations are classified in accordance with so called RAID levels. RAID4, RAID5 and RAID6 configurations use parity generated from stored data as redundant information, which can be used to later recover the stored data is one or two of the storage media fails. By using the parity information, data stored in multiple storage units (HDD) in a disturbed manner can be later reconstructed should one or two equipment failures occur. In this manner, high data availability of the RAID system is achieved.

In many situations, it is desirable to have sensitive data stored in data storage systems encrypted. Exemplary storage systems providing hardware data encryption capability include Fujitsu's Eternus 8000 and 4000 disk array systems, described at http://www.fujitsu.com/global/services/computing/storage/system/eternus8000/ and http://www.fujitsu.com/global/services/computing/storage/system/eternus-4000/.

On the other hand, the encryption process creates a performance overhead, which reduces the total storage system throughput. This is because the encryption/decryption processing requires various computer resources, including processor time, memory and bus bandwidth.

Therefore, what is needed is a method and system which would provide for the encryption of the stored data, while optimizing the utilization of system resources based on the user's requirements.

SUMMARY OF THE INVENTION

The inventive methodology is directed to methods and systems that substantially obviate one or more of the above and other problems associated with conventional techniques for data encryption in storage systems.

In accordance with one aspect of the inventive methodology, there is provided a computerized data storage system comprising a plurality of physical disks operable to store data and an array controller operatively coupled to the plurality of physical disks. The array controller includes a processing unit and a memory unit operable to store encryption information and parity group information. In accordance with this aspect of the invention, the array controller is operable to group the plurality of physical disks into a parity group, to store the parity group information associated with the parity group in the memory unit and to handle parity information corresponding to the parity group in accordance with the stored encryption information.

In accordance with one aspect of the inventive methodology, there is provided a method for writing data in a storage array system, as well as a computer-readable medium embodying a computer programming product implementing said method. The inventive method involves receiving a write command issued by a host; obtaining a logical unit information specified in the write command; receiving the write data from the host; determining old data and old parity information required to calculate new parity information and checking encryption information associated with the old parity information. If the old parity information is encrypted, the inventive method involves decrypting the old parity information. The inventive method further involves decrypting the old data; calculating the new parity information using the old data and the old parity information and checking encryption information associated with the new parity information. If the encryption information associated with the new parity information indicates that the new parity is to be encrypted, the calculated new parity information is encrypted. Finally, the encrypted new parity information is stored.

In accordance with another aspect of the inventive methodology, there is provided a method for reading data in a storage array system, as well as a computer-readable medium embodying a computer programming product implementing said method. The inventive method involves receiving a read command issued by a host; obtaining a logical unit information specified in the read command; determining data and parity information required to reconstruct the read data; and checking encryption information associated with the parity information. If the parity information is encrypted, the parity information is decrypted. The inventive method further involves decrypting the data; reconstructing the read data using the data and the parity information; and returning the reconstructed read data to the host.

In accordance with another aspect of the inventive methodology, there is provided a method for reconstructing data stored in a storage array system, as well as a computer-readable medium embodying a computer programming product implementing said method. The inventive method involves determining logical unit to be reconstructed; determining data and parity information required to reconstruct the data and checking encryption information associated with the parity information. If the parity information is encrypted, the parity information is decrypted. The inventive method further involves decrypting the data; and reconstructing the read data using the data and the parity information.

Additional aspects related to the invention will be set forth in part in the description which follows, and in part will be obvious from the description, or may be learned by practice of the invention. Aspects of the invention may be realized and attained by means of the elements and combinations of various elements and aspects particularly pointed out in the following detailed description and the appended claims.

It is to be understood that both the foregoing and the following descriptions are exemplary and explanatory only and are not intended to limit the claimed invention or application thereof in any manner whatsoever.

BRIEF DESCRIPTION OF THE DRAWINGS

The accompanying drawings, which are incorporated in and constitute a part of this specification exemplify the embodiments of the present invention and, together with the description, serve to explain and illustrate principles of the inventive technique. Specifically:

FIG. 6 illustrates an exemplary mapping information.

FIG. 7 illustrates exemplary parity group information.

FIG. 8 illustrates an exemplary embodiment of the key table.

FIG. 9 illustrates an exemplary embodiment of the encryption information.

FIG. 10 illustrates an exemplary embodiment of an element of cache information.

DETAILED DESCRIPTION

In the following detailed description, reference will be made to the accompanying drawing(s), in which identical functional elements are designated with like numerals. The aforementioned accompanying drawings show by way of illustration, and not by way of limitation, specific embodiments and implementations consistent with principles of the present invention. These implementations are described in sufficient detail to enable those skilled in the art to practice the invention and it is to be understood that other implementations may be utilized and that structural changes and/or substitutions of various elements may be made without departing from the scope and spirit of present invention. The following detailed description is, therefore, not to be construed in a limited sense. Additionally, the various embodiments of the invention as described may be implemented in the form of a software running on a general purpose computer, in the form of a specialized hardware, or combination of software and hardware.

The inventive concept provides users with the ability to specify flexible encryption options in a storage system using RAID technology. The users can use the inventive system to achieve a configuration which achieves a desired balance between security and system load/performance. Specifically, one aspect of the inventive methodology enables the user to enable or disable the encryption of the redundant parity information. As would be appreciated by those of skill in the art, change of the data causes change of the parity information and, when parity is not encrypted, a close analysis of parity change may enable one to reconstruct the all or some of the encrypted data. Therefore, when a user chooses the encryption of the parity information, it becomes more difficult to reconstruct the plain data from the encrypted data.

The inventive storage system also provides a function for monitoring and reporting the current or projected utilization of various computer resources including processor and memory utilization, which assists the user in selecting the proper security option.

First Embodiment

System Configuration

Figure 1:
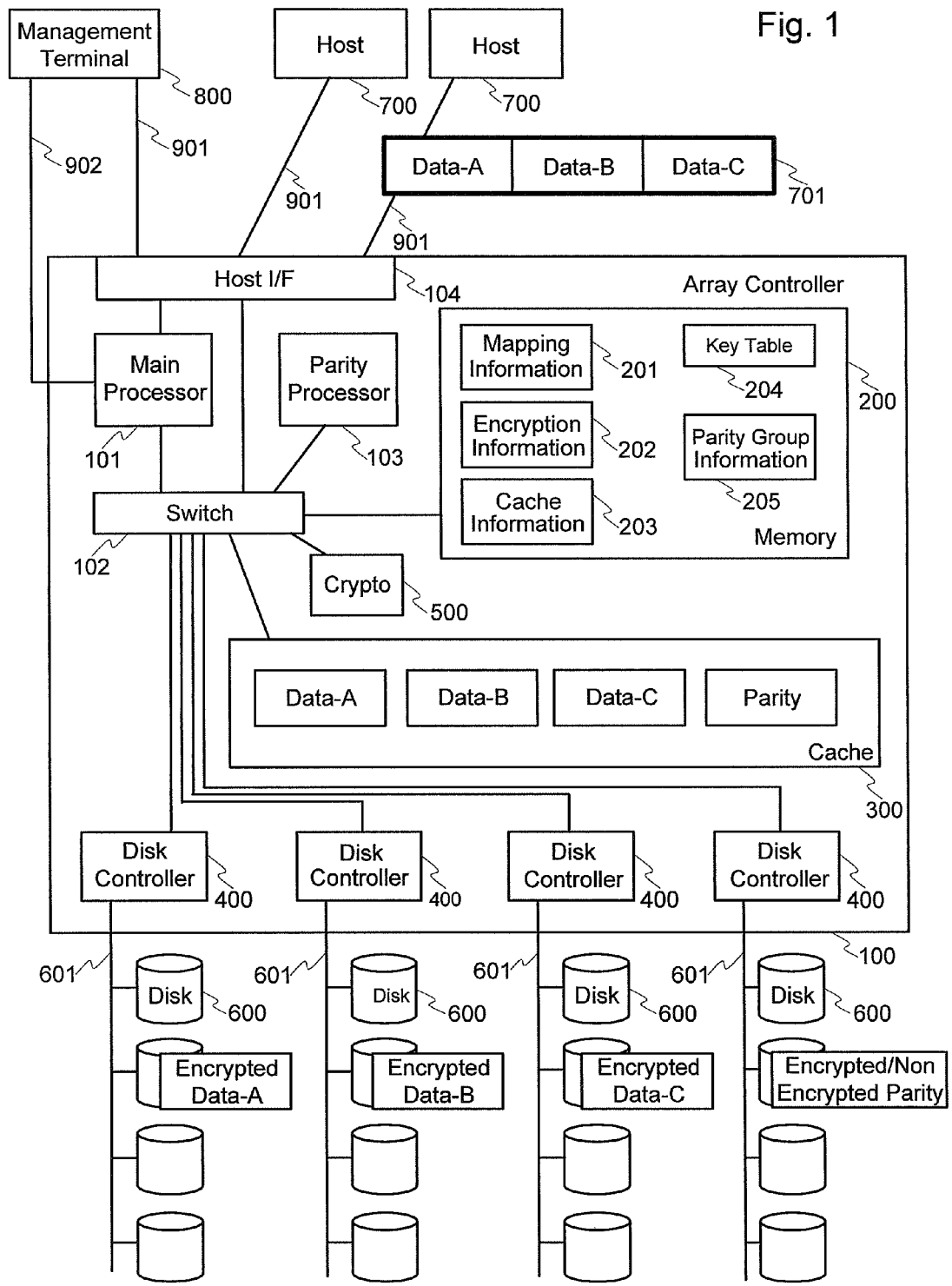
FIG. 1 illustrates an exemplary configuration of a storage system in accordance with the first embodiment of the inventive concept.

FIG. 1 illustrates an exemplary configuration of a storage system in accordance with the first embodiment of the inventive concept. The storage system of the first embodiment incorporates array controller 100, main processor 101, switch 102, parity processor 103, host interface 104, memory 200, cache 300, disk controller 400, cryptographic module (Crypto module) 500, one or more disks (HDD) 600 and backend path 601, which may be implemented using Fibre Channel, SATA, SAS, iSCSI(IP) or any other similar interfaces.

The main processor 101 executes various processes relating to the operation of the array controller 100. The main processor 101 and other components of the storage system shown in FIG. 1 uses information stored in memory 200, which includes mapping information 201, encryption information 202, cache Information 203, key table 204, and parity group information 205. The aforesaid information may be organized in a tabular form, in form of database records, or otherwise.

Host 700 and management terminal 800 are connected to the host interface 104 of the array controller 100 via host path 901, which may be implemented based on Fibre Channel or iSCSI(IP) interconnects. Management terminal 800 is also connected to the array controller 100 via an out-of-band network 902, which may be an IP-based network, such as a TCP/IP network.

Parity Groups and Logical Units

Figure 2:
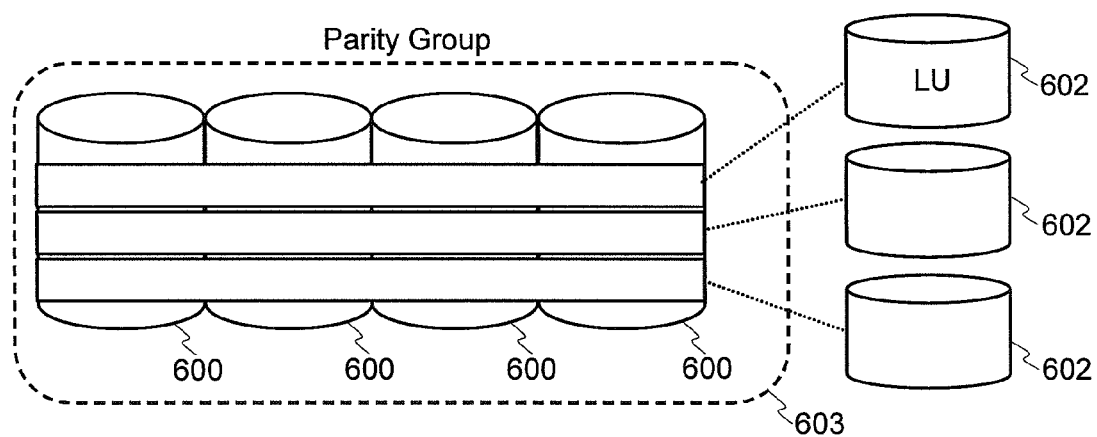
FIG. 2 illustrates the relationship among disks, parity group and logical units (LU).

FIG. 2 illustrates the relationship among disks 600, parity group 603 and logical units (LU) 602. The parity group 603 is a collection of multiple physical storage disks. Consistent with the RAID technology, data and parity generated from the data are distributed among multiple physical disks within the parity group. The parity group provides storage resources to store the data in the aforesaid distributed manner. The storage area provided by parity group is subdivided into multiple LUs. An LU can also consist of storage areas of multiple parity groups. Each of these LUs is handled by the host 700 as a separate storage area. In other words, the storage system of the first embodiment provides storage resources to the host 700 in the form of LUs 602.

Generating Parity and Reconstructing Data Using Parity

Figure 3:
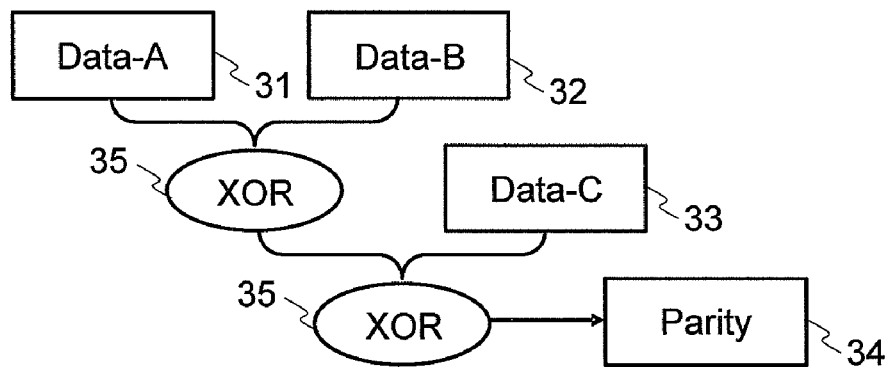
FIG. 3 illustrates an exemplary method for generating the parity information.
Figure 4:
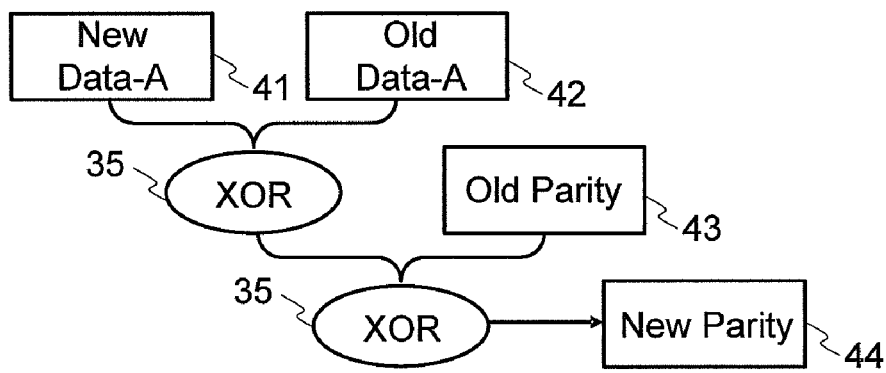
FIG. 4 illustrates an exemplary method for calculating a new parity value when the relevant data is updated.
Figure 5:
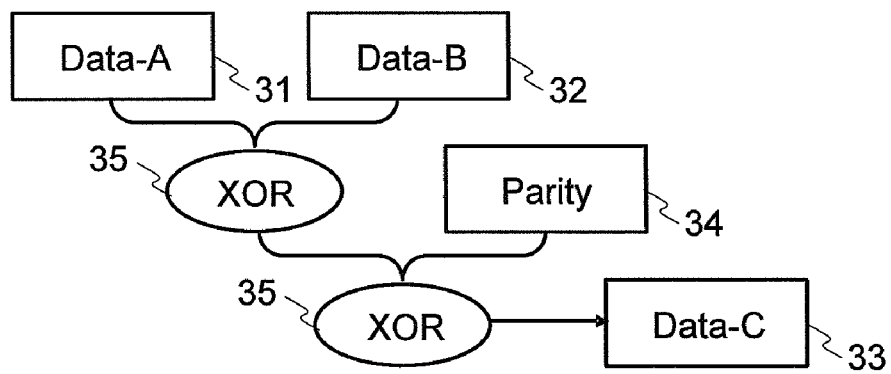
FIG. 5 illustrates an exemplary method for reconstructing a data stripe from the parity and the other data stripes.

FIGS. 3, 4 and 5 illustrate exemplary methods for generating parity and reconstructing data based on the RAID technology. Specifically, FIG. 3 illustrates an exemplary method for generating the parity information. Parity 34 is generated by means of an XOR (exclusive OR) calculation 35, wherein Data-A 31, Data-B 32 and Data-C 33 are data sets (stripes) that generate one unit of parity and represent information units distributed to each disk in a single parity group. In particular, the parity is calculated using the formula: Data-A XOR Data-B XOR Data-C=Parity.

To maintain the above relationship between the data stored in the physical disks and the parity, the parity must be changed when the stored data is changed. FIG. 4 illustrates an exemplary method for calculating a new parity value when the relevant data is updated. The new parity value is obtained using the following calculation: new Data-A (41) XOR old Data-A (42) XOR old Parity (43)=new Parity (44).

Because the above relationship between the data and the parity is always maintained, one data stripe can be reconstructed from the other data stripe and the parity value. That is, if a portion of the stored data is lost due to a failure of a disk in a parity group, the lost data stripe can be recovered. FIG. 5 illustrates an exemplary method for reconstructing a data stripe from the parity and the other data stripes. Specifically, Data-C 33 can be reconstructed using the following calculation: Data-A XOR Data-B XOR Parity=Data-C. The storage systems configured in accordance with the RAID level 6 (RAID6) can recover the data even upon losing two data stripes, because the RAID6 keeps two parity codes and distributes them to two different disks.

Process for Write Operation

Figure 11:
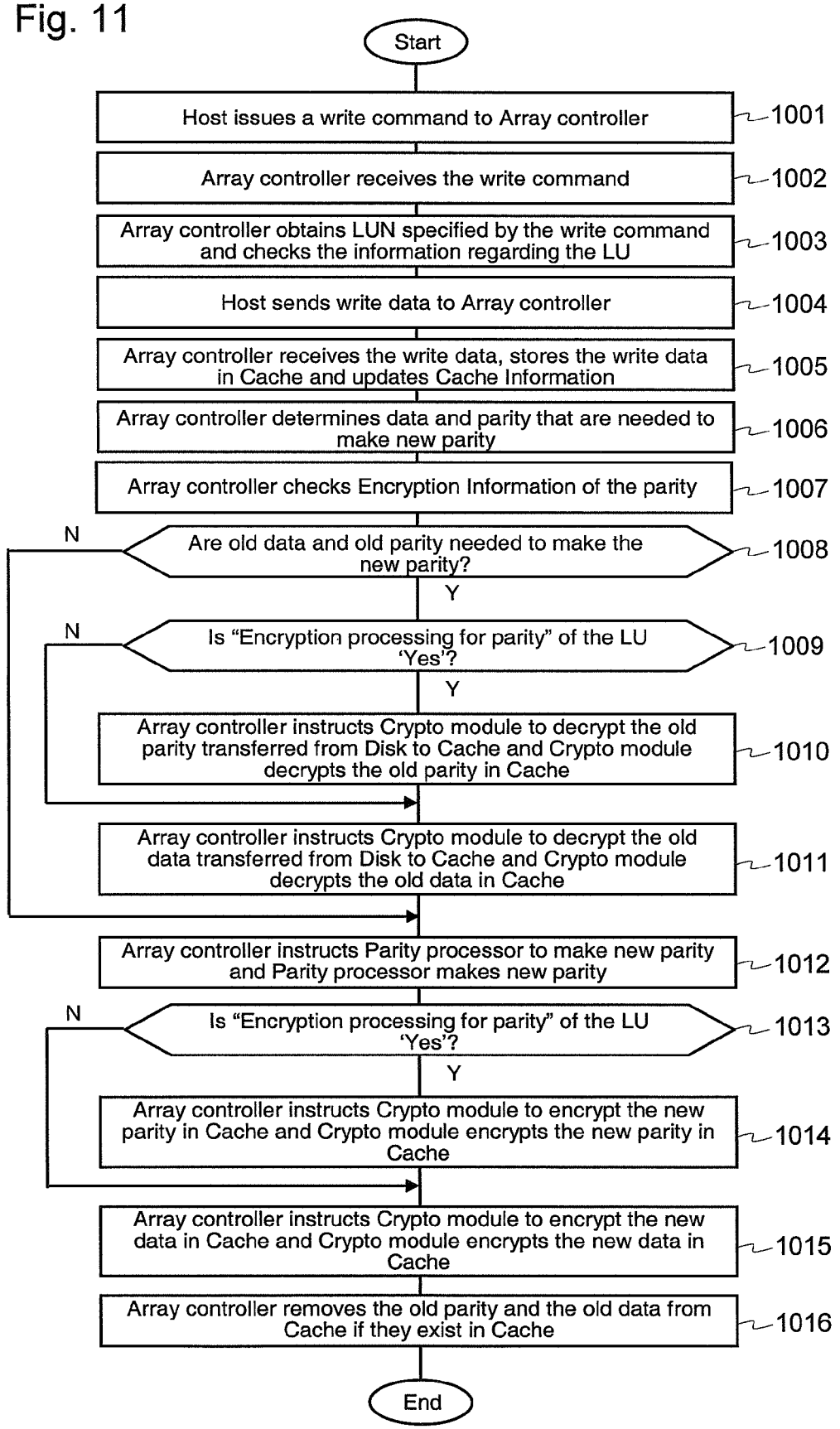
FIG. 11 illustrates an exemplary process for executing a write command issued by the host.

FIG. 11 illustrates an exemplary process for executing a write command issued by Host 700.

At step 1001, the host 700 issues a write command to the array controller 100.

At step 1002, the array controller 100 receives the write command.

At step 1003, the array controller 100 obtains information associated with the write command and obtains LUN (LU Number) specified by the write command. This information may be obtained by the array controller 100 using a reference provided by the write command. At step 1003, the array controller 100 checks various information associated with the target LU, including the storage area specified by the write command, which is checked by referring the mapping information 201, parity group information 205 and the like. FIG. 6 illustrates an exemplary mapping information 201. This information describes a mapping between various areas of the LUs and the corresponding areas of the parity group (i.e. disks). FIG. 7 illustrates exemplary parity group information 205. This information includes attributes such as RAID level for each parity group and identifiers the disks that form the respective parity group. The aforesaid information including the mapping information 201 and the parity group information 205 are specified by the users through the management terminal 800 or the host 700, or using any other appropriate mechanism. FIG. 9 illustrates an exemplary embodiment of the encryption information 202.

At step 1004, the host 700 sends the write data to the array controller 100.

At step 1005, the array controller 100 receives the write data and stores the write data in the cache 300 and updates the cache information 203. FIG. 10 illustrates an exemplary embodiment of an element of the cache information 203. In one embodiment of the invention, the cache information 203 is composed of a list structure of information elements similar to the element shown in FIG. 10 and a hash table enabling fast searching of the aforesaid information elements. The array controller 100 uses the cache information 203 to manage the storage areas of the cache 300. To this end, the array controller 100 updates the cache information to allocate area(s) in the cache 300.

At step 1006, the array controller 100 identifies data and parity units that are required to generate new parity value in accordance with the RAID methodology described hereinabove. It should be noted that there are at least two different ways to generate the new parity information, one is illustrated in FIG. 3 and the other one is illustrated in FIG. 4. For example, in the latter way, the old data and the old parity are required to generate the new parity value.

At step 1007, the array controller 100 references the encryption information 202 and checks the setting for the LU.

At step 1008, if it has been determined that the old data and the old parity are needed, the process proceeds to step 1009. If not, the process proceeds to step 1012.

At step 1009, if the value of the record "Encryption processing for parity" in the encryption information table 202 associated with the LU is set to "yes", the process proceeds to step 1010. Otherwise, the process proceeds to step 1011.

At step 1010, the array controller 100 prepares the old parity information. The array controller 100 orders the disk controller 400 to transfer the old parity information from the disk 600 to the cache 300, if such transfer is needed. After that, the array controller 100 instructs the cryptographic module 500 to decrypt the old parity information and, pursuant to this instruction, the cryptographic module 500 decrypts the old parity value.

At step 1011, the array controller 100 prepares the old data. The array controller 100 orders the disk controller 400 to transfer the old data from the disk 600 to the cache 300, if such transfer is needed. After that, the array controller 100 instructs the cryptographic module 500 to decrypt the old data and, pursuant to this request, the cryptographic module 500 decrypts the old data.

At step 1012, the array controller 100 instructs the parity processor 103 to make the new parity. The parity processor 103 makes the new parity in accordance with one of the two methods described hereinabove.

At step 1013, if the value of the "Encryption processing for parity" record of the table 202 associated with the target LU is set to 'yes', the process proceeds to step 1014. Otherwise, the process proceeds to step 1015.

At step 1014, the array controller 100 instructs the cryptographic module 500 to encrypt the new parity within the cache 300 and, pursuant to this instruction, the cryptographic module 500 performs the encryption of the new parity.

At step 1015, the array controller 100 instructs the cryptographic module 500 to encrypt the new data within the cache 300 and, pursuant to this instruction, the cryptographic module 500 encrypts the new data.

At step 1016, if the old parity and the old data are still stored in the cache 300, the array controller 100 removes them from the cache 300 and updates the cache information 203 accordingly.

Process for Read Operation

Figure 12:
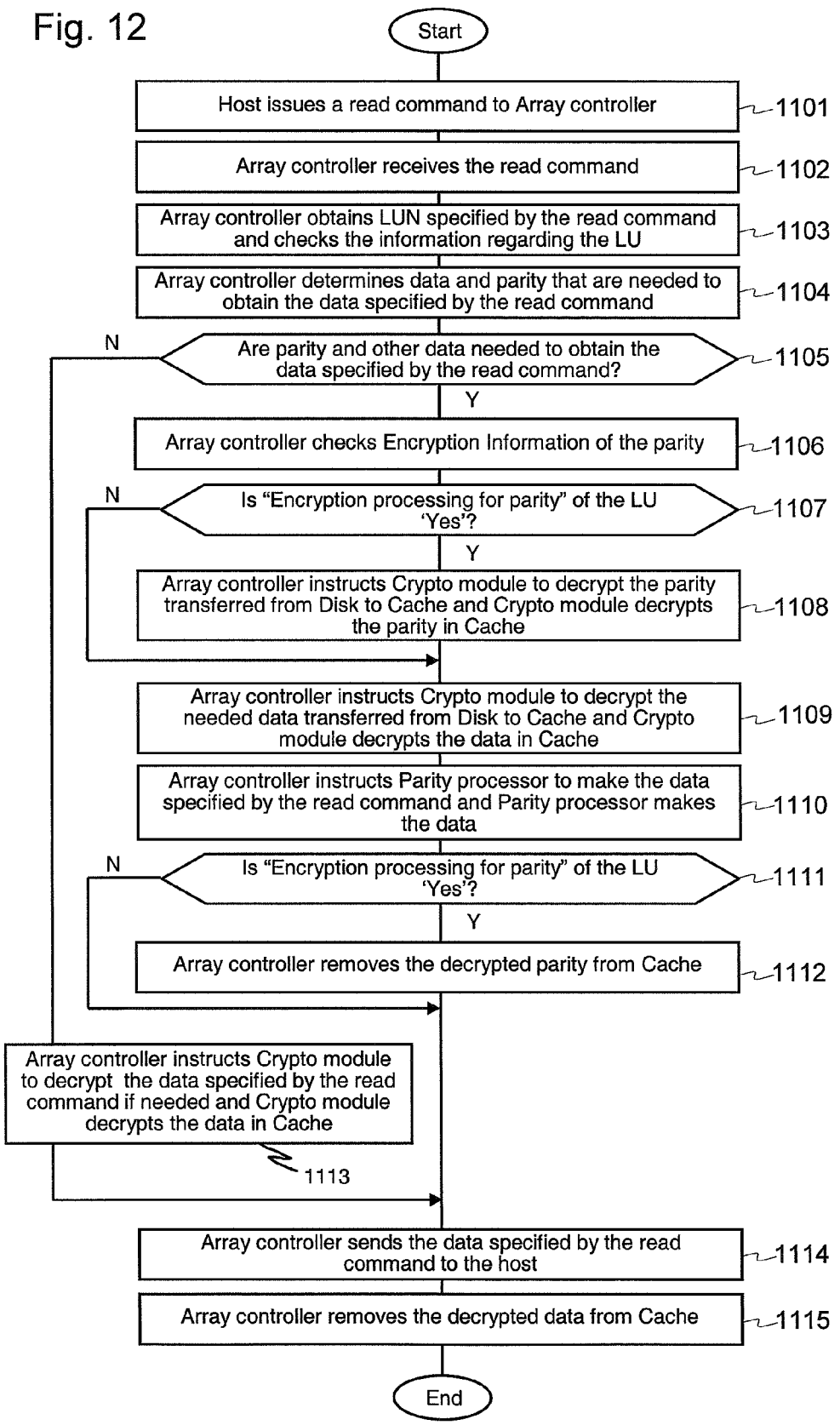
FIG. 12 illustrates an exemplary process for handling a read command issued by the host.

FIG. 12 illustrates an exemplary process for handling a read command issued by the host 700.

At step 1101, the host 700 issues a read command to the array controller 100.

At step 1102, the array controller 100 receives the aforesaid read command.

At step 1103, the array controller 100 references the information associated with the read command and obtains the LUN information specified by the read command. After that, the array controller 100 checks the referenced information, including the area wherein the read data is stored by referring to the mapping information 201, parity group information 205 as well as other information sources.

At step 1104, the array controller 100 identifies the data and the parity information that are needed to obtain the read data specified by the read command. If the read data is not available due a failure of one of the disks 600 storing a portion of the read data, the read data is reconstructed from other stored data and the parity information in accordance with the RAID technology illustrated in FIG. 5.

At step 1105, if the parity information and the other data are required, the process proceeds to step 1106. Otherwise, the process proceeds to step 1113.

At step 1106, the array controller 100 references the encryption information 202 and checks the settings for the source LU storing the data to be read.

At step 1107, if it is determined that the value of the "Encryption processing for parity" record of the Encryption information 202 table corresponding to the source LU is set to 'yes,' the process proceeds to step 1108. Otherwise, the process proceeds to step 1109.

At step 1108, the array controller 100 prepares the parity information. Specifically, the array controller 100 orders the disk controller 400 to transfer the parity from the disk 600 to the cache 300, if such transfer is required. After the transfer, the array controller 100 instructs the cryptographic module 500 to decrypt the parity information and, pursuant to this request, the cryptographic module 500 decrypts the aforesaid parity.

At step 1109, the array controller 100 prepares the required data. The array controller 100 orders the disk controller 400 to transfer the required data from the disk 600 to the cache 300, if the transfer is required. After that, the array controller 100 instructs the cryptographic module 500 to decrypt the required data and, pursuant to this instruction, the cryptographic module 500 decrypts the required data.

At step 1110, the array controller 100 instructs the parity processor 103 to reconstruct the read data specified by the read command. The parity processor 103 generates the read data from the parity information and the other required data.

At step 1111, if the value of the "Encryption processing for parity" record of the encryption information 202 corresponding to the source LU is set to 'yes', the process proceeds to step 1112. Otherwise, the process proceeds to step 1114.

At step 1112, the array controller 100 deletes the decrypted (plain) parity information from the cache 300 and updates the cache information 203 accordingly.

At step 1113, the array controller 100 instructs the disk controller 400 to transfer the read data specified by the read command from the disks 600 to cache 300, if such transfer is required. After that, the array controller 100 instructs the cryptographic module 500 to decrypt the read data and, pursuant to this instruction, the cryptographic module 500 decrypts the read data.

At step 1114, the array controller 100 sends the read data specified by the read command to the host 700, which has issued the read command.

At step 1115, the array controller 100 deletes the decrypted (plain) data from the cache 300 and updates the cache information 203 accordingly.

Process for Data Reconstruction Operation

Figure 13:
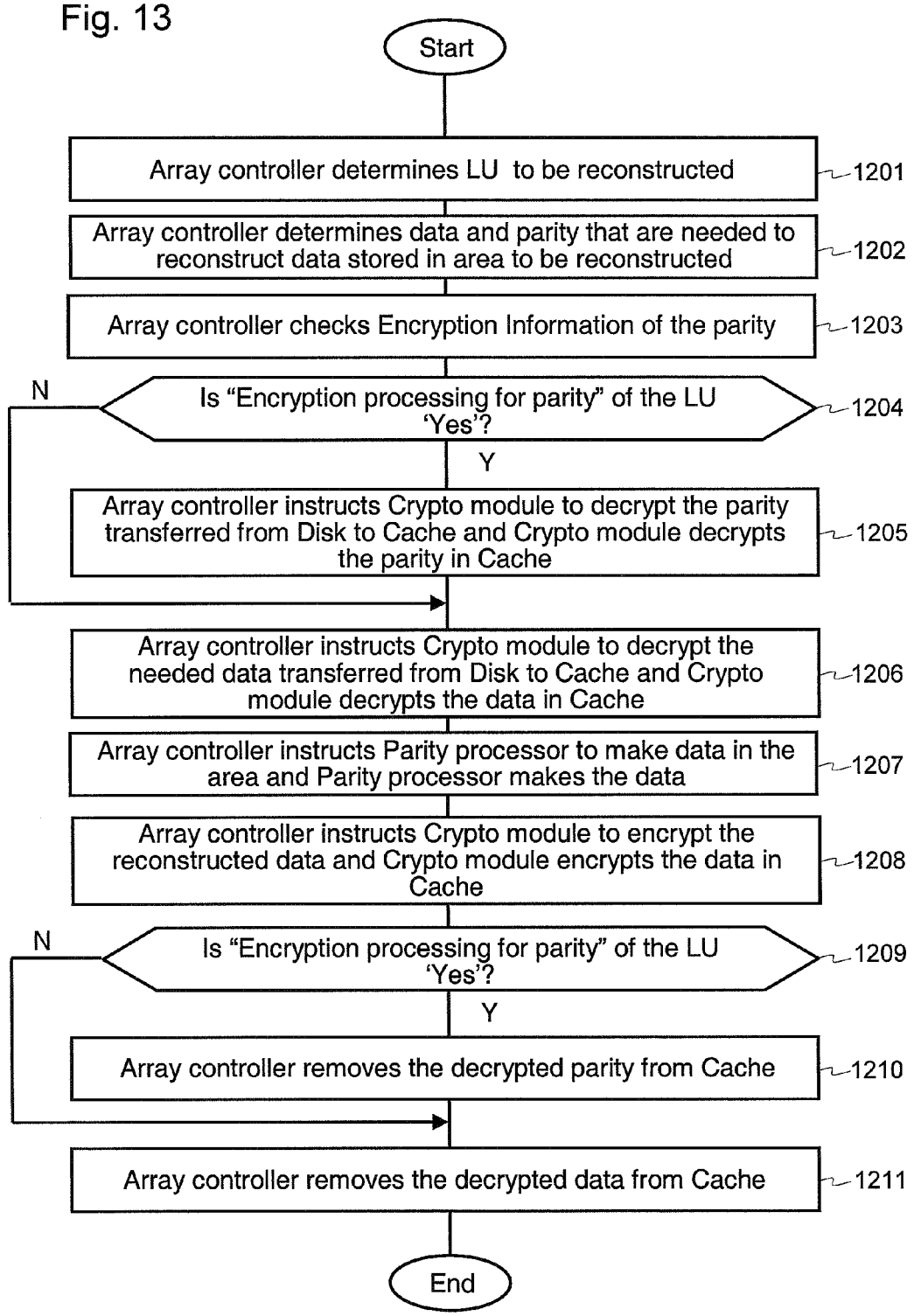
FIG. 13 illustrates an exemplary process for performing the data reconstruction operation.

The data reconstruction operation is performed in order to reconstruct the data, which became unavailable due to a failure of one of the disks 600. As stated hereinabove, by using the method illustrates in FIG. 5, the lost or unavailable data can be reconstructed on a new disk 600. FIG. 13 illustrates an exemplary process for performing the data reconstruction operation.

At step 1201, the array controller 100 identifies the LU to be reconstructed. In one embodiment of the invention, this LU is specified by the user. In another embodiment, the array controller 100 determines the LU to be reconstructed automatically.

At step 1202, the array controller 100 identifies the data as well as the parity information that are required for reconstruction the data stored in the storage area.

At step 1203, the array controller 100 references the encryption information 202 and checks the encryption settings for the parity information.

At step 1204, if the value of the "Encryption processing for parity" record of the encryption information 202 corresponding to the LU is set to 'yes', the process proceeds to step 1205. Otherwise, the process proceeds to step 1206.

At step 1205, the array controller 100 prepares the parity information for the data reconstruction. The array controller 100 instructs the disk controller 400 to transfer the parity information from the disk 600 to the cache 300, if such transfer is required. After that, the array controller 100 instructs the cryptographic module 500 to decrypt the parity and, pursuant to this instruction, the cryptographic module 500 decrypts the parity information.

At step 1206, the array controller 100 prepares the data required for reconstruction. Specifically, the array controller 100 instructs the disk controller 400 to transfer the required data from the disk 600 to the cache 300, if such transfer is required. After that, the array controller 100 instructs the cryptographic module 500 to decrypt the required data and the cryptographic module 500 decrypts the required data pursuant to the received request.

At step 1207, the array controller 100 instructs the parity processor 103 to reconstruct the data stored in the storage area. In response to the received request, the parity processor 103 reconstructs the data from the parity information as well the available portion of the data.

At step 1208, the array controller 100 instructs the cryptographic module 500 to encrypt the reconstructed data in the cache 300 and, pursuant to this instruction, the cryptographic module 500 encrypts the reconstructed data in the cache 300.

At step 1209, if it is determined that the value of the "Encryption processing for parity" record of the encryption information 202 corresponding to the LU is set to 'yes', the process proceeds to step 1210. Otherwise, the process proceeds to step 1211.

At step 1210, the array controller 100 deletes the decrypted (plain) parity data from the cache 300 and updates the cache information 203 accordingly.

At step 1211, the array controller 100 deletes the decrypted (plain) data from the cache 300 and updates the cache information 203 accordingly.

Initialization Procedure

Figure 14:
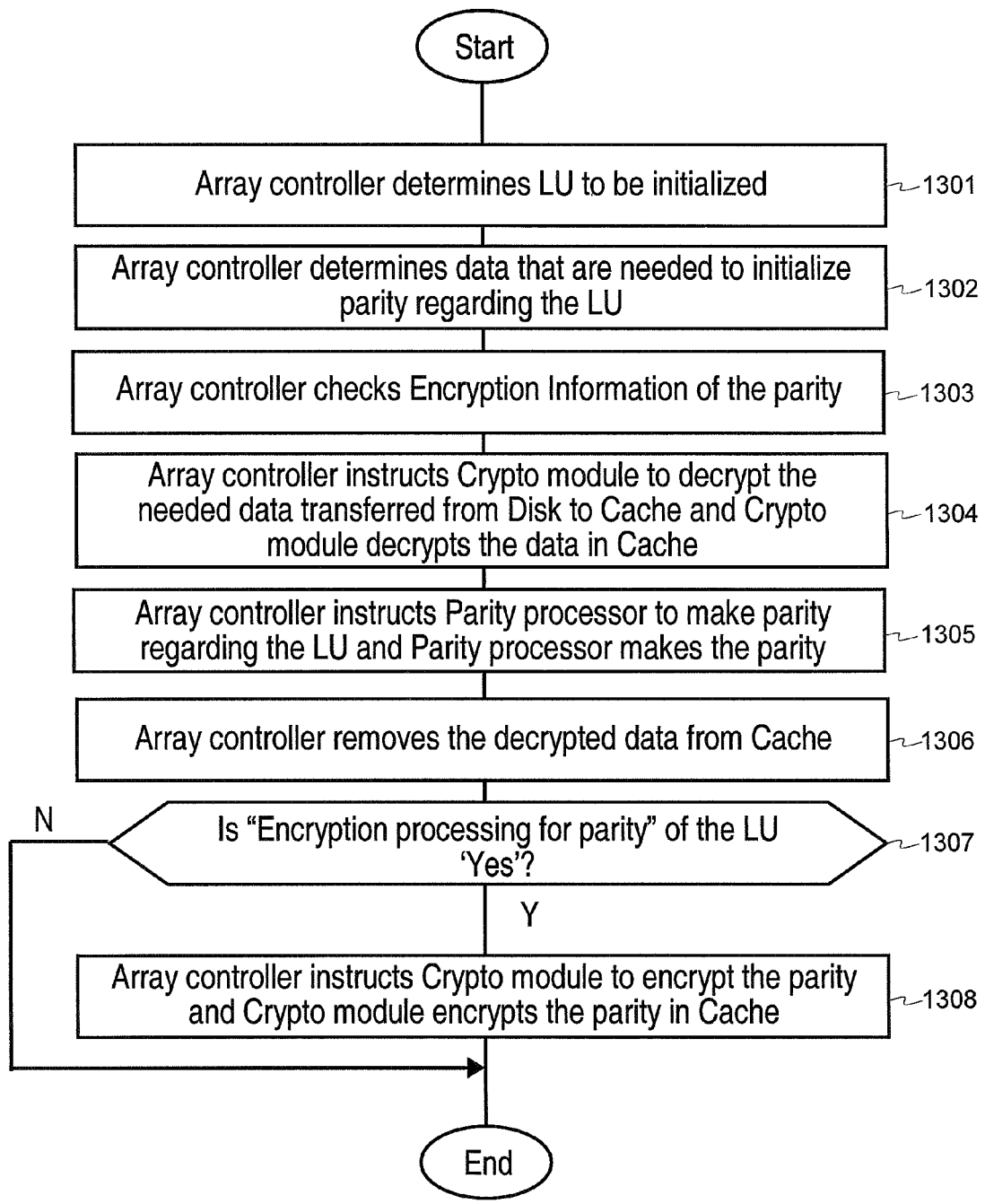
FIG. 14 illustrates an exemplary embodiment of an initialization procedure.

In the initial state, the data and parity information corresponding to the same LU in the same parity group must maintain the relation described above with reference to FIG. 3. In other words, the parity information must be generated from the data by the method illustrated in FIG. 3. FIG. 14 illustrates an exemplary embodiment of an initialization procedure.

At step 1301, the array controller 100 identifies the LU to be initialized.

At step 1302, the array controller 100 identifies data, which is required to calculate the parity information associated with the LU.

At step 1303, the array controller 100 references the encryption information 202 and checks the parity information settings.

At step 1304, the array controller 100 prepares the data for initialization. The array controller 100 instructs the disk controller 400 to transfer the data from the disk 600 to the cache 300, if such transfer is needed. After that, the array controller 100 instructs the cryptographic module 500 to decrypt the required data and the cryptographic module 500 decrypts the data as instructed.

At step 1305, the array controller 100 instructs the parity processor 103 to calculate the parity information. Pursuant to this instruction, the parity processor 103 calculates the parity information from the data.

At step 1306, the array controller 100 deletes the decrypted (plain) data from the cache 300 and updates the cache information 203 accordingly.

At step 1307, if it is determined that the value of "Encryption processing for parity" column in the encryption information 202 is 'yes', the process proceeds to step 1308. Otherwise, the process terminates.

At step 1308, the array controller 100 instructs the cryptographic module 500 to encrypt the parity in the cache 300 and, pursuant to this instruction, the cryptographic module 500 encrypts the parity information.

Process for Set or Change Setting

Users can set or change the encryption settings for the parity information. Specifically, the users can choose whether or not the encryption of parity is performed. Such a selection may be performed by the users upon the consideration of the available computer resources and the security requirements for the stored data.

Figure 15:
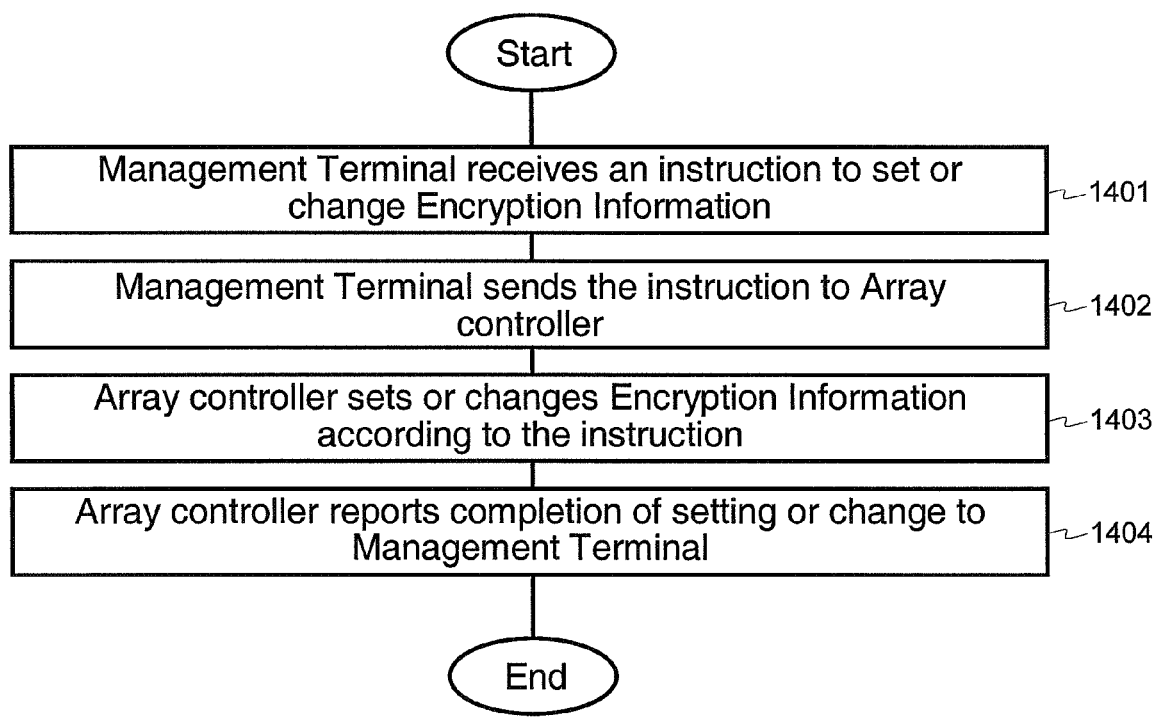
FIG. 15 illustrates an exemplary embodiment of a process for creating or changing the parity information encryption setting.

FIG. 15 illustrates an exemplary embodiment of a process for creating or changing the parity information encryption setting.

At step 1401, the management terminal 800 receives an instruction from the user to create or change the encryption information 202.

At step 1402, the management terminal sends the instruction to the array controller 100 via the network 902 or the host path 901.

At step 1403, the array controller 100 creates or changes the encryption information 202 according to the received instruction.

At step 1404, the array controller 100 reports the completion of the creation or change of the encryption information back to the management terminal 800 via the network 902 or he host path 901.

In the encryption/decryption process mentioned hereinabove, the cryptographic module 500 obtains an encryption key for the specified LU by referencing the key table 204. FIG. 8 illustrates an exemplary embodiment of the key table 204. In an embodiment of the invention, only the cryptographic module 500 has access to the encryption key. The cryptographic module 500 generates a different key value for each existing LU and stores the generated keys in the key table 204. The algorithm for generating the key values may be based on a random number generation algorithm.

The cryptographic method for encrypting data in each LU also can be specified in the encryption information 202. Exemplary cryptographic methods include, for example, AES (Advanced Encryption Standard) and DES (Data Encryption Standard), which are well known to persons of skill in the art. In one embodiment of the invention, the encryption and decryption keys are identical. In another embodiment of the invention, the encryption and decryption keys are different, such as in the RSA's asymmetric cryptographic algorithms.

The mode of cryptographic operation for each LU can also be specified in encryption information 202. Exemplary cryptographic operation modes include EBC (Electronic codebook) and CBC (cipher-block chaining), which are well known to persons of skill in the art. LRW-AES, a mode developed for storage systems, is also suitable to be used in an embodiment of the inventive concept.

In an embodiment of the inventive concept, the storage system incorporates capability for monitoring and reporting the utilization and available unused capacity of various computer resources including processor load and memory usage. This information is helpful to the users in making the decisions about choosing the appropriate encryption options for the parity information.

Second Embodiment

System Configuration

Figure 16:
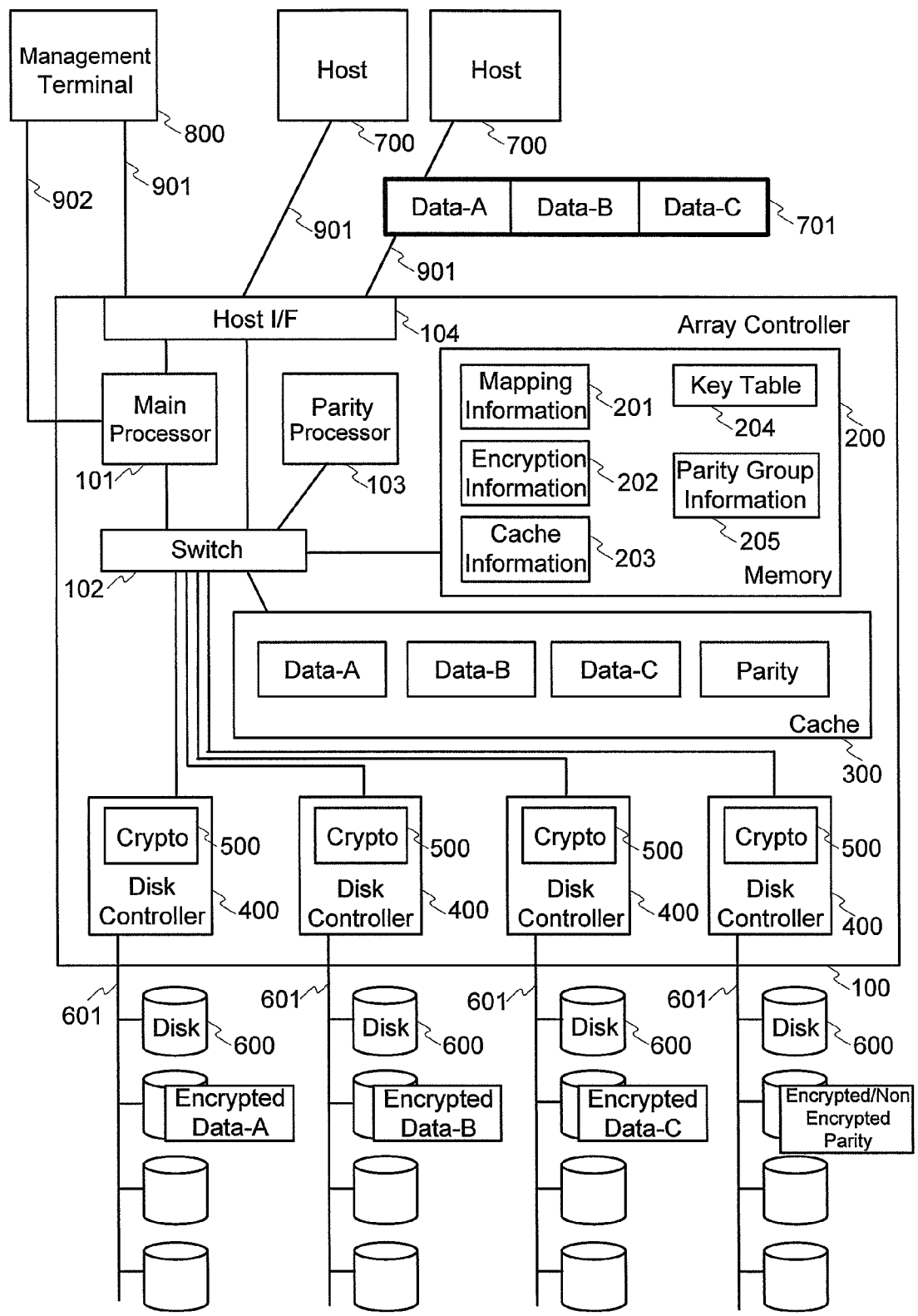
FIG. 16 illustrates an exemplary storage system configuration in accordance with the second embodiment of the inventive concept.

FIG. 16 illustrates an exemplary storage system configuration in accordance with the second embodiment of the inventive concept. The main difference of the configuration shown in FIG. 16 from the corresponding configuration of the first embodiment is that each disk controller 400 incorporates a separate cryptographic module 500. Using the aforesaid cryptographic module 500, each disk controller 400 can perform encryption and decryption during transferring of the data or parity information between the cache 300 and the disk 600.

Operating Processes

Exemplary operating sequences performed by the system while executing write command, read command, data reconstruction operation and initialization procedure are described in FIGS. 17, 18, 19 and 20, respectively.

The primary difference between the processes illustrated in FIGS. 17, 18, 19 and 20 and the respective processes of the first embodiment is that the disk controller 400 performs all encryption and decryption operations on data and/or the parity information during the transfer of the respective data or parity information between the cache 300 and the disk 600. On the other hand, in the first embodiment described hereinabove, these operations were performed by the combination of the array controller 100 and the cryptographic module 500.

Figure 17:
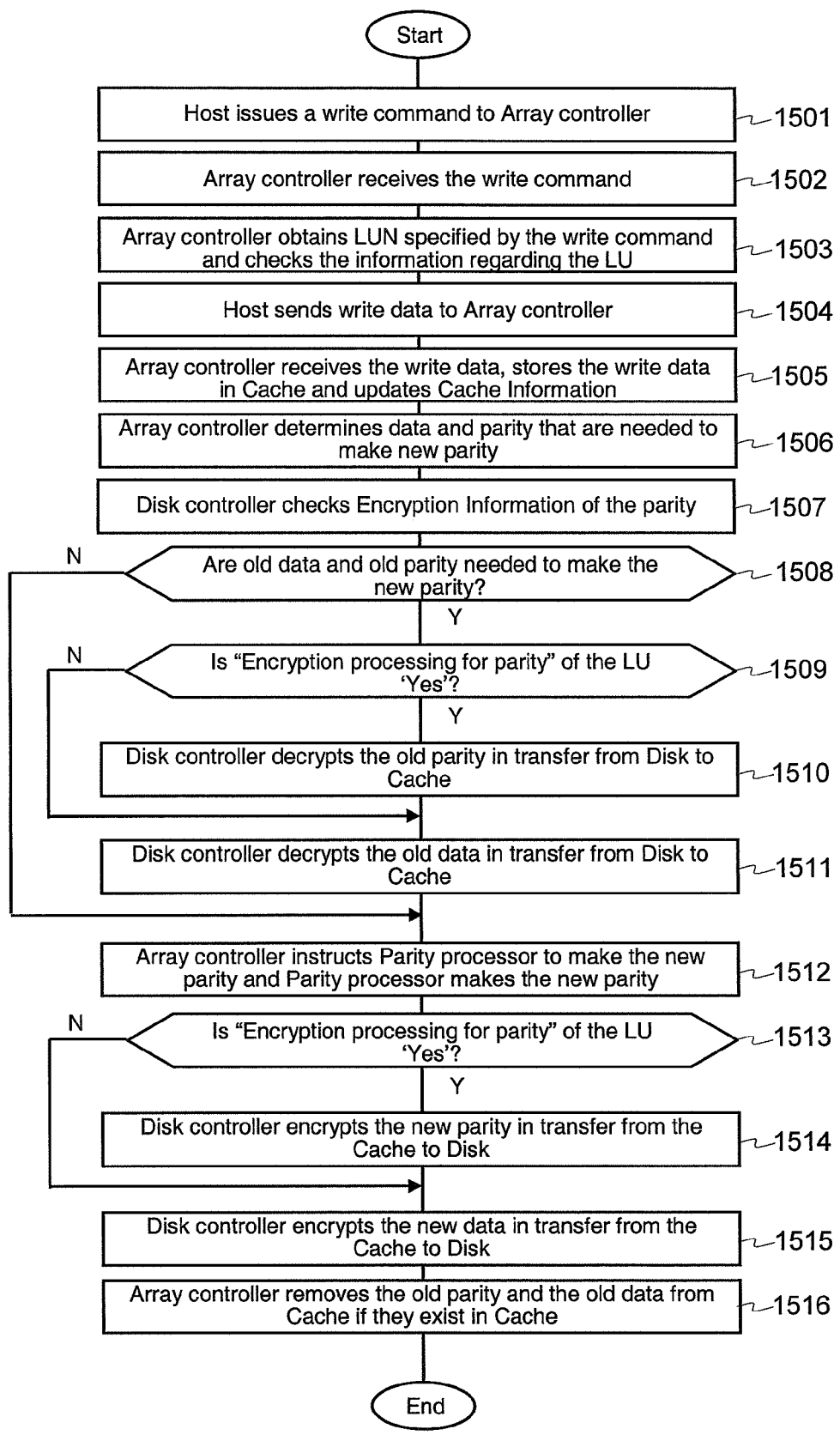
FIG. 17 illustrates operating sequence of the data write operation illustrated.
Figure 18:
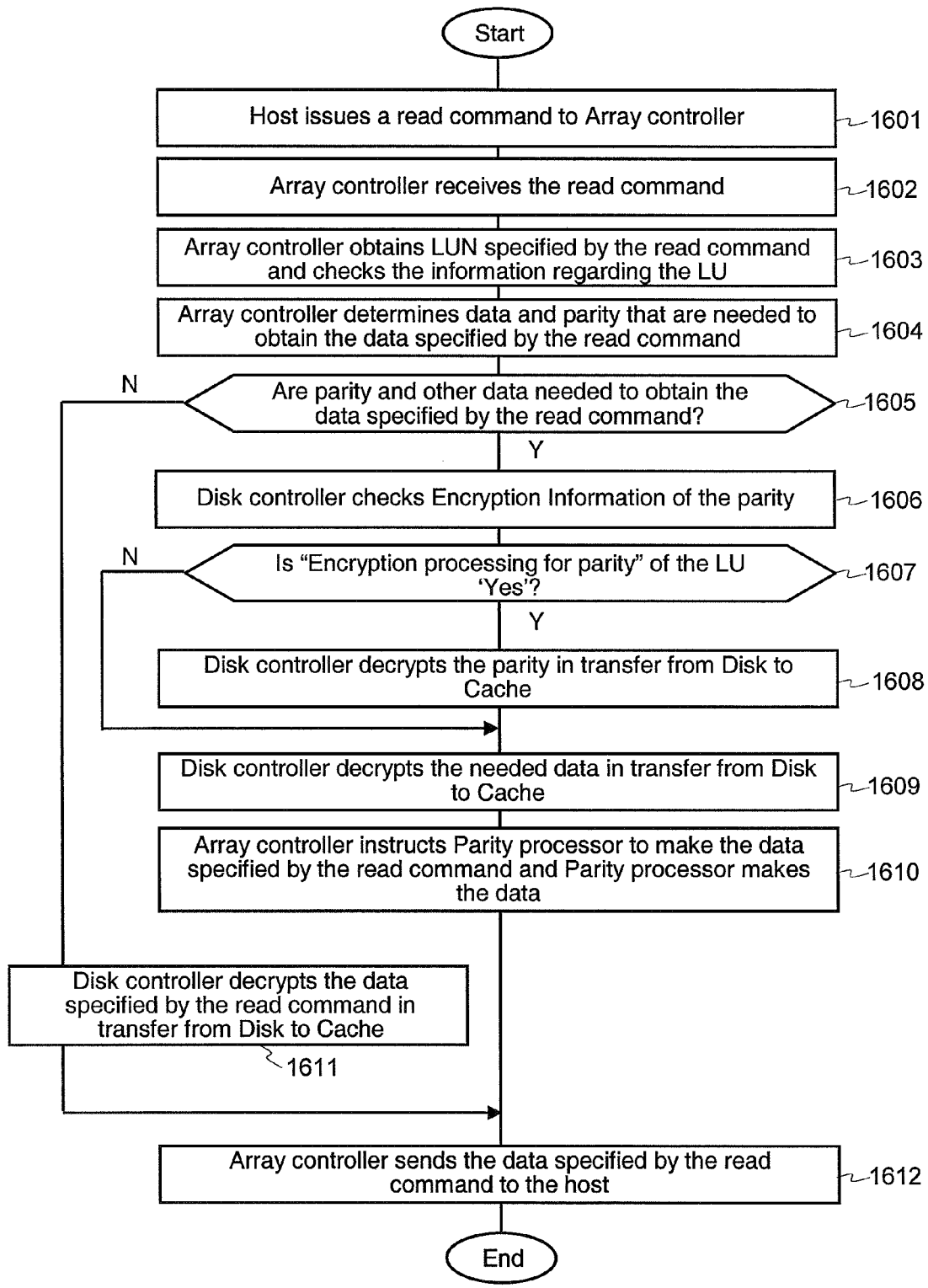
FIG. 18 illustrates operating sequence of the data read operation.
Figure 19:
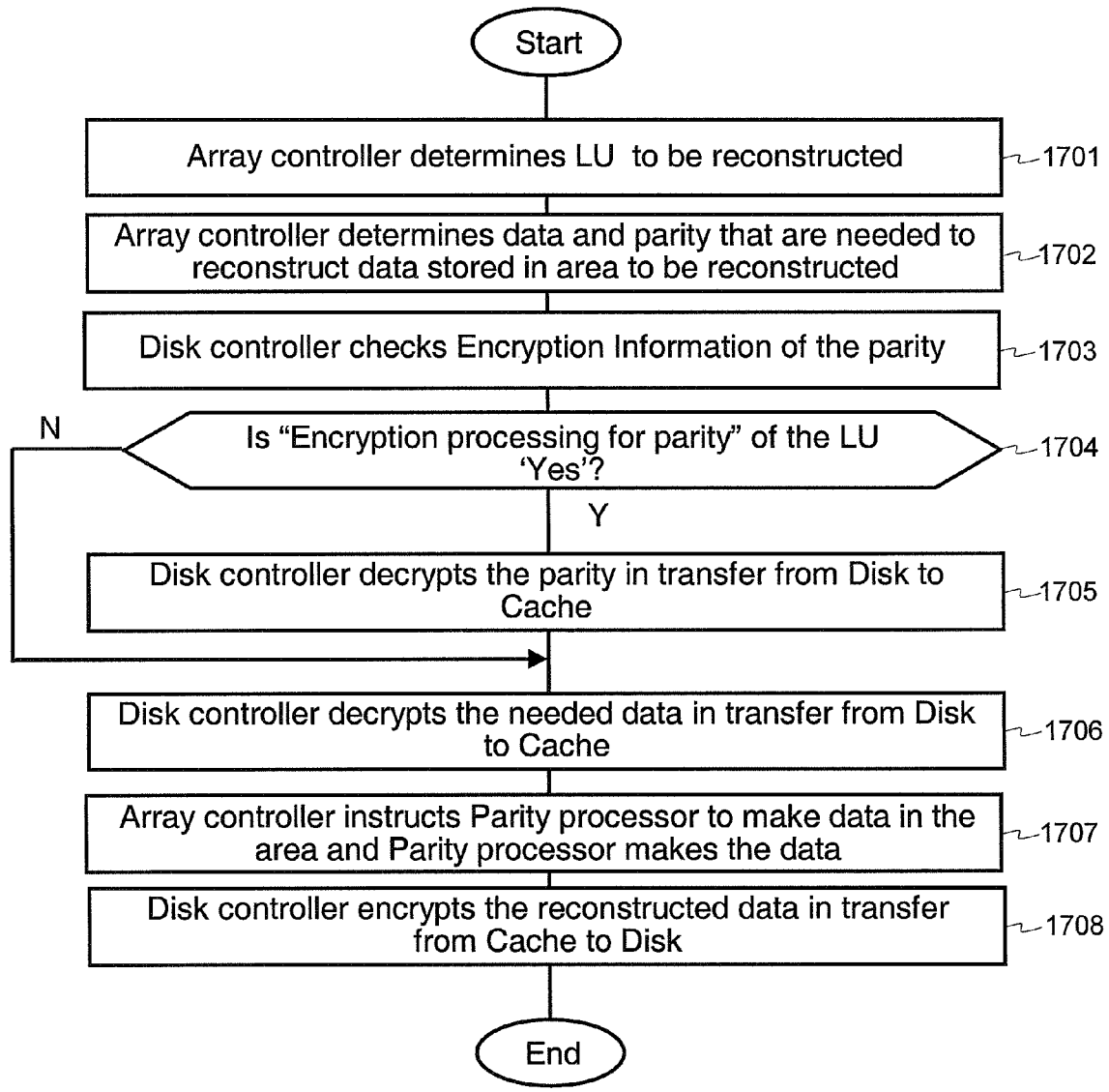
FIG. 19 illustrates an exemplary operating sequence performed by the system while executing data reconstruction operation.
Figure 20:
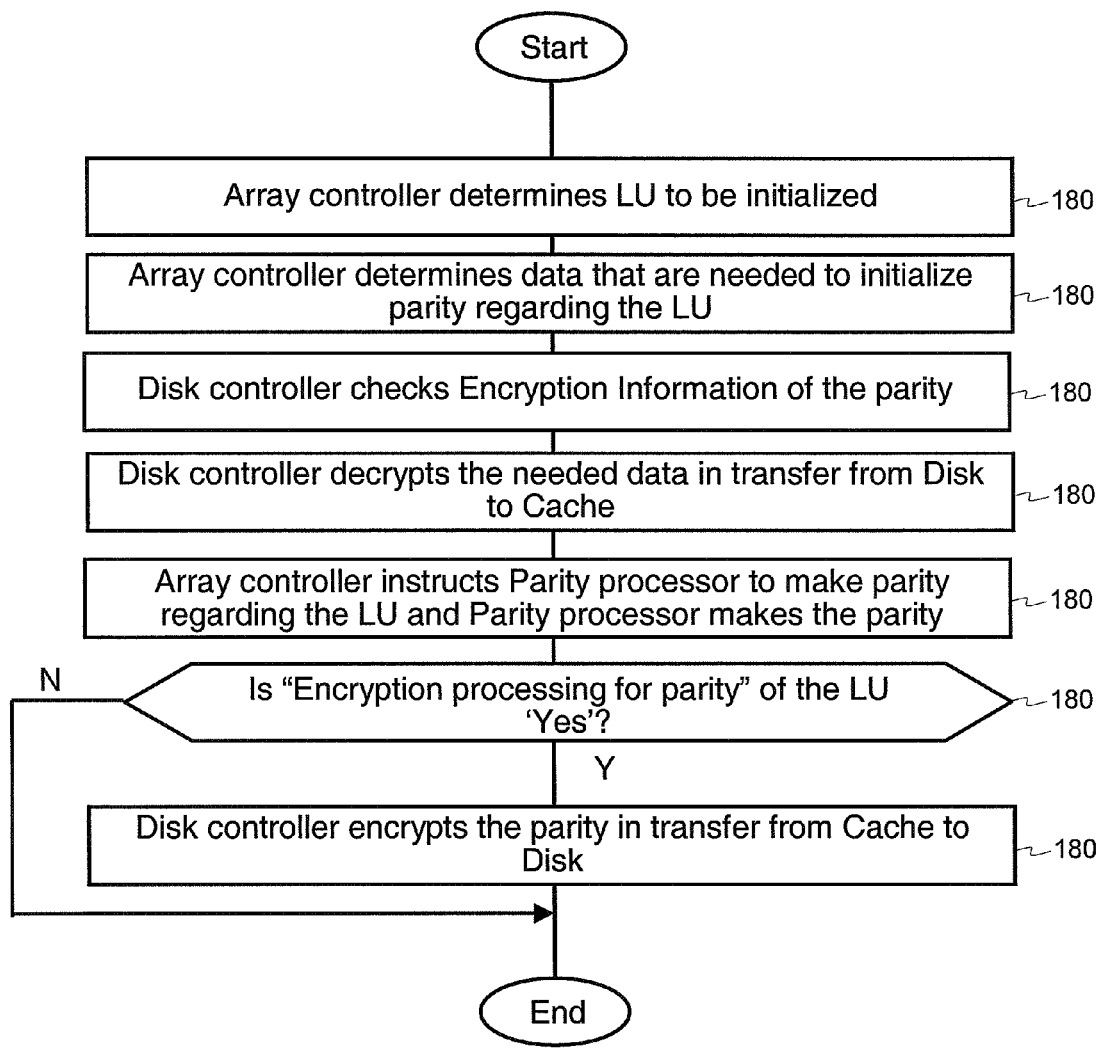
FIG. 20 illustrates operating sequence for the initialization procedure.

Specifically, steps 1501 through 1516 of the operating sequence of the data write operation illustrated in FIG. 17 generally correspond to the respective steps 1001 through 1016 of the operating sequence of the first embodiment shown in FIG. 11, with the exception that the encryption and decryption operations are performed by the cryptographic module 500 of the disk controller 400. Likewise, steps 1601 through 1612 of the operating sequence of the data read operation illustrated in FIG. 18 generally correspond to the respective steps 1101 through 1010, 1113 and 1114 of the operating sequence of the first embodiment shown in FIG. 12, with the exception that the encryption and decryption operations are performed by the cryptographic module 500 of the disk controller 400.

Similarly generally correspond to the respective steps 1201 through 1208 of the operating sequence of the first embodiment shown in FIG. 13, with the exception that the encryption and decryption operations are performed by the cryptographic module 500 of the disk controller 400. In a similar manner, steps 1801 through 1807 of the operating sequence for the initialization procedure illustrated in FIG. 20 generally correspond to the respective steps 1301 through 1305, 1307 and 1308 of the operating sequence of the first embodiment shown in FIG. 14, with the exception that the encryption and decryption operations are performed by the cryptographic module 500 of the disk controller 400.

In the second embodiment, various flexible parity encryption configurations may be selected by the users upon the consideration of the availability and usage of the system resources and the desired security level for the data. Moreover, the aforesaid procedures may be implemented by means of the communication between the array controller 100 and the disks 600 even if the cryptographic module 500 (included in the disk controller 400 in this embodiment) is integrated with the disk 600.

Third Embodiment

System Configuration

Figure 21:
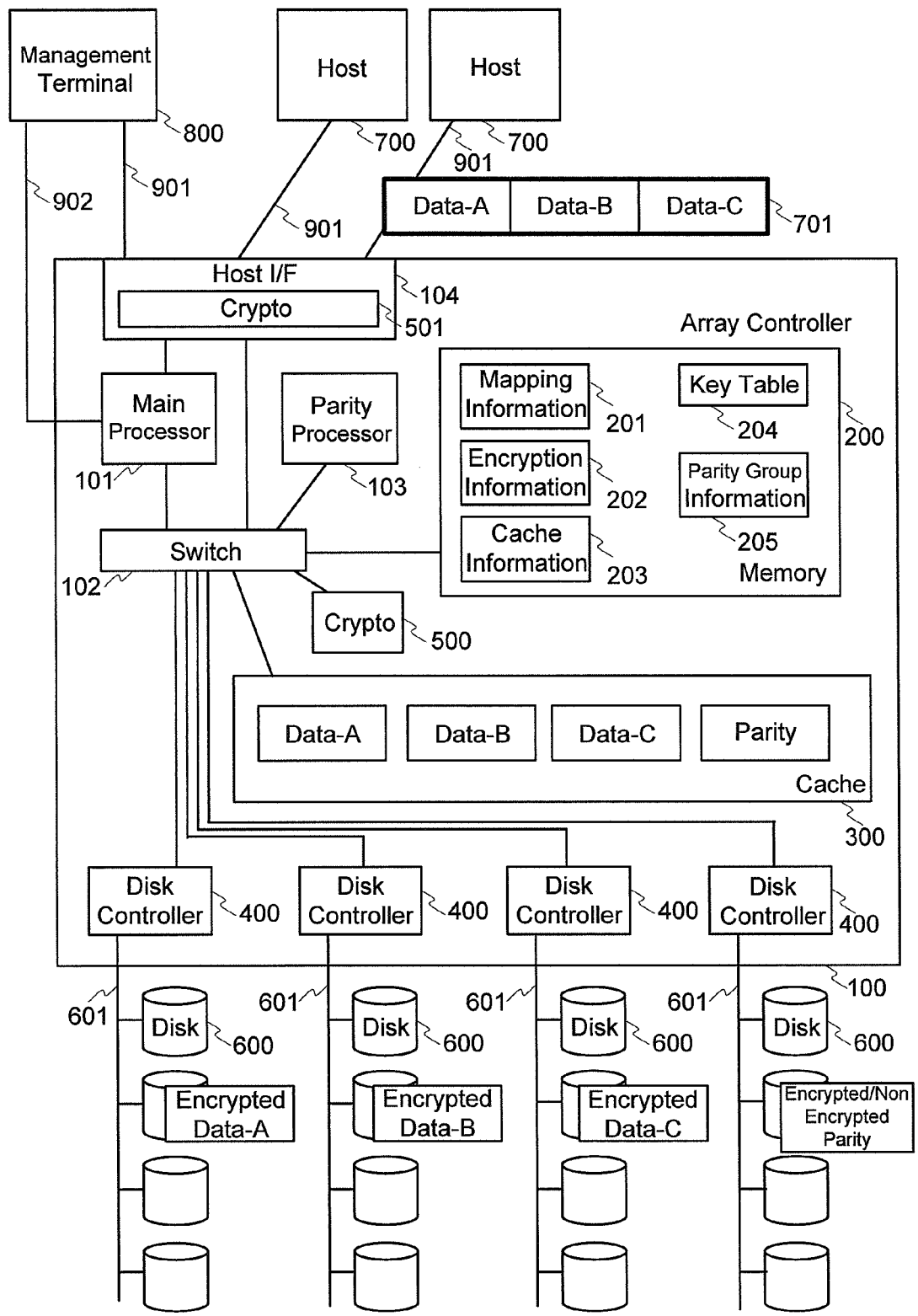
FIG. 21 illustrates an exemplary system configuration representative of the third embodiment of the inventive concept.

FIG. 21 describes an exemplary system configuration representative of the third embodiment of the inventive concept. The primary difference of the configuration shown in FIG. 21 from the corresponding configuration of the first embodiment is that the host interface 104 incorporates an integrated cryptographic module 501. With the cryptographic module 501, the host interface 400 encrypts the data transferred from the host 700 to the cache 300 and decrypts the data transferred from the cache 300 to the host 700.

It should be noted that the processes described with reference to FIGS. 11, 12, 13, 14 and 15 can be applied to the storage system of this embodiment.

Finally, it should be understood that processes and techniques described herein are not inherently related to any particular apparatus and may be implemented by any suitable combination of components. Further, various types of general purpose devices may be used in accordance with the teachings described herein. It may also prove advantageous to construct specialized apparatus to perform the method steps described herein. The present invention has been described in relation to particular examples, which are intended in all respects to be illustrative rather than restrictive. Those skilled in the art will appreciate that many different combinations of hardware, software, and firmware will be suitable for practicing the present invention. For example, the described software may be implemented in a wide variety of programming or scripting languages, such as Assembler, C/C++, perl, shell, PHP, Java, etc.

Moreover, other implementations of the invention will be apparent to those skilled in the art from consideration of the specification and practice of the invention disclosed herein. Various aspects and/or components of the described embodiments may be used singly or in any combination in a computerized storage system. It is intended that the specification and examples be considered as exemplary only, with a true scope and spirit of the invention being indicated by the following claims.

What is claimed is:

1. A computerized data storage system comprising:
   a. A plurality of physical disks operable to store data; and
   b. An array controller operatively coupled to the plurality of physical disks, the array controller comprising:
      i. A processing unit; and
      ii. A memory unit operable to store encryption information and parity group information,
         wherein the array controller is operable to group the plurality of physical disks into a parity group, to store the parity group information associated with the parity group in the memory unit and to handle parity information corresponding to the parity group in accordance with the stored encryption information.

2. The computerized data storage system of claim 1, wherein the array controller further comprises a crypto module operable to encrypt the parity information based on the stored encryption information.

3. The computerized data storage system of claim 1, wherein the array controller further comprises a plurality of disk controllers operable to couple each of the physical disks to the array controller, wherein at least one of the plurality of disk controllers comprises a crypto module operable to encrypt the parity information passing from the array controller to the respective physical disk and decrypt the parity information passing from the respective disk to the array controller based on the stored encryption information.

4. The computerized data storage system of claim 1, wherein the encryption information is specified by a user.

5. The computerized data storage system of claim 1, wherein the handling of the parity information corresponding to the parity group by the array controller comprises, upon receipt of a write command from a host by the array controller:
   i. Recalculating the parity information corresponding to the parity group; and
   ii. Encrypting the recalculated parity information based on the stored encryption information.

6. The computerized data storage system of claim 5, wherein the recalculating the parity information by the array controller comprises:
   a. Determining old data and old parity needed to recalculate the parity information;
   b. Determining the encryption processing for the old parity based on the stored encryption information;
   c. If the old parity is encrypted, decrypting the old parity;
   d. Decrypting the old data;
   e. Calculating new parity using the old parity, old data and write data associated with the write command;
   f. Determining the encryption processing for the new parity based on the stored encryption information; and
   g. Encrypting the new parity based on the determined encryption processing for the new parity.

7. The computerized data storage system of claim 6, wherein the array controller further comprises a cache memory and wherein the array controller is operable to use the cache memory to calculate the new parity.

8. The computerized data storage system of claim 1, wherein the handling of the parity information corresponding to the parity group by the array controller comprises, upon receipt of a read command from a host by the array controller:
   i. Determining whether other data and the parity information are needed to reconstruct data specified by the read command;
   ii. If it has been determined that the other data and the parity information are needed, reconstructing the data specified in the read command using the other data and the parity information; and
   iii. Providing the reconstructed data specified by the read command to the host.

9. The computerized data storage system of claim 8, wherein the array controller further comprises a cache memory and wherein the array controller is operable to use the cache memory to reconstruct the data specified by the read command.

10. The computerized data storage system of claim 9, wherein the handling of the parity information corresponding to the parity group by the array controller further comprises:
   a. Identifying the data and the parity information needed to reconstruct the data specified in the read command;
   b. Determining the encryption processing for the parity information based on the stored encryption information;
   c. If the parity information is encrypted, decrypting the parity information; and d. Decrypting the data.

11. The computerized data storage system of claim 10, wherein the handling of the parity information corresponding to the parity group by the array controller further comprises removing the decrypted parity information and the decrypted data from the cache memory.

12. A method for writing data in a storage array system, the method comprising:
   a. Receiving a write command issued by a host;
   b. Obtaining a logical unit information specified in the write command;
   c. Receiving the write data from the host;
   d. Determining old data and old parity information required to calculate new parity information;
   e. Checking encryption information associated with the old parity information;
   f. If the old parity information is encrypted, decrypting the old parity information;
   g. Decrypting the old data;
   h. Calculating the new parity information using the old data and the old parity information;
   i. Checking encryption information associated with the new parity information;
   j. If the encryption information associated with the new parity information indicates that the new parity is to be encrypted, encrypting the calculated new parity information; and
   k. Storing the encrypted new parity information.

13. The method of claim 12, further comprising erasing the decrypted old parity information and the decrypted old data.

14. The method of claim 12, wherein the encrypting and the decrypting are performed by a crypto module of an array controller of the storage array system.

15. The method of claim 12, wherein the encrypting and the decrypting are performed by a crypto module of a physical disk controller of the storage array system.

16. A method for reading data in a storage array system, the method comprising:
   a. Receiving a read command issued by a host;
   b. Obtaining a logical unit information specified in the read command;
   c. Determining data and parity information required to reconstruct the read data;
   d. Checking encryption information associated with the parity information;
   e. If the parity information is encrypted, decrypting the parity information;
   f. Decrypting the data;
   g. Reconstructing the read data using the data and the parity information; and
   h. Returning the reconstructed read data to the host.

17. The method of claim 16, further comprising erasing the decrypted parity information and the decrypted data.

18. The method of claim 16, wherein the encrypting and the decrypting are performed by a crypto module of an array controller of the storage array system.

19. The method of claim 16, wherein the encrypting and the decrypting are performed by a crypto module of a physical disk controller of the storage array system.

20. A method for reconstructing data stored in a storage array system, the method comprising:
   a. Determining logical unit to be reconstructed;
   b. Determining data and parity information required to reconstruct the data;
   c. Checking encryption information associated with the parity information;
   d. if the parity information is encrypted, decrypting the parity information;
   e. Decrypting the data; and
   f. Reconstructing the read data using the data and the parity information.

21. The method of claim 20, further comprising erasing the decrypted parity information and the decrypted data.

22. The method of claim 20, wherein the encrypting and the decrypting are performed by a crypto module of an array controller of the storage array system.

23. The method of claim 20, wherein the encrypting and the decrypting are performed by a crypto module of a physical disk controller of the storage array system.

24. A computer-readable medium embodying a computer programming product for writing data in a storage array system, comprising:
   a. Code for receiving a write command issued by a host;
   b. Code for obtaining a logical unit information specified in the write command;
   c. Code for receiving the write data from the host;
   d. Code for determining old data and old parity information required to calculate new parity information;
   e. Code for checking encryption information associated with the old parity information and if the old parity information is encrypted, decrypting the old parity information;
   f. Code for decrypting the old data;
   g. Code for calculating the new parity information using the old data and the old parity information;
   h. Code for checking encryption information associated with the new parity information and if the encryption information associated with the new parity information indicates that the new parity is to be encrypted, encrypting the calculated new parity information; and
   i. Code for storing the encrypted new parity information.

25. A computer-readable medium embodying a computer programming product for reading data in a storage array system, comprising:
   a. Code for receiving a read command issued by a host;
   b. Code for obtaining a logical unit information specified in the read command;
   c. Code for determining data and parity information required to reconstruct the read data;
   d. Code for checking encryption information associated with the parity information and if the parity information is encrypted, decrypting the parity information;
   e. Code for decrypting the data;
   f. Code for reconstructing the read data using the data and the parity information; and
   g. Code for returning the reconstructed read data to the host.

26. A computer-readable medium embodying a computer programming product for reconstructing data stored in a storage array system, comprising:
   a. Code for determining logical unit to be reconstructed;
   b. Code for determining data and parity information required to reconstruct the data;
   c. Code for checking encryption information associated with the parity information and if the parity information is encrypted, decrypting the parity information;
   d. Code for decrypting the data; and
   e. Code for reconstructing the read data using the data and the parity information.

* * * * *